US006758537B2

United States Patent
O'Dea et al.

(10) Patent No.: US 6,758,537 B2
(45) Date of Patent: Jul. 6, 2004

(54) METHOD OF CONTROLLING A BRAKE VALVE APPARATUS

(75) Inventors: Kevin Austin O'Dea, Ann Arbor, MI (US); Eric E. Krueger, Ann Arbor, MI (US); Andrew A. Beach, Ann Arbor, MI (US); Steven Paul Loudon, Howell, MI (US); Bryan Todd Fulmer, Byron, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/197,622

(22) Filed: Jul. 16, 2002

(65) Prior Publication Data

US 2004/0012251 A1 Jan. 22, 2004

(51) Int. Cl.⁷ ................................................ B60T 8/36
(52) U.S. Cl. ................................ 303/119.1; 303/113.1; 303/157
(58) Field of Search ........................... 303/113.1, 113.2, 303/116.2, 139, 145, 119.1, 157, 158, 189, 169

(56) References Cited

U.S. PATENT DOCUMENTS 5,735,858 A * 4/1998 Koike et al. ................ 303/145
6,247,766 B1 6/2001 Subramanian et al. ... 303/119.2

\* cited by examiner

*Primary Examiner*—Thomas Williams
(74) *Attorney, Agent, or Firm*—Robert M. Sigler

(57) ABSTRACT

Noise produced during a supplemental brake apply is reduced eliminated by reducing the quantity of additional brake fluid supplied to the pump during the apply. The prime valve is opened only at the initiation of the supplemental apply to supply a predetermined small quantity of brake fluid to the accumulator and pump inlet and is then closed for the remainder of the apply. The quantity of extra fluid supplied can be retained by the accumulator and does not need to by blown off back to the master cylinder. The apply valve of the non-regulated wheel brake is controlled to regulate pressure to the regulated wheel brake through the apply valve thereof, which is left open while the release valve of the regulated wheel brake is left closed. The release valve of the non-regulated wheel is controlled to maintain a lower pressure at the non-regulated wheel, preferably equal to the master cylinder pressure whenever possible, while permitting fluid flow back to the accumulator. The more even flow of this arrangement through the circuit permits operation with the smaller quantity of extra brake fluid. The reduction in blow-off events reduces objectionable noise produced by the blow-off valve when the vehicle operator initiates manual brake apply during a supplemental apply.

7 Claims, 5 Drawing Sheets

METHOD OF CONTROLLING A BRAKE VALVE APPARATUS

TECHNICAL FIELD

The technical field of this invention is vehicle brake control.

BACKGROUND OF THE INVENTION

Many vehicle brake systems include supplemental apply capability, wherein one or more wheel brakes may be applied by the brake control without initiation by the vehicle operator. An example of such a system includes a brake control with a vehicle stability enhancement (VSE) system, in which a selected wheel brake of the system may be applied to counter an undesired vehicle yawing motion in closed loop control of vehicle yaw rate. Such a system may include an electric motor driven pump for providing braking fluid pressure to the selected wheel and a normally open isolation valve between the master cylinder and the individual brake apply valves that is closed during a supplemental apply to permit braking pressure at the brake apply valves, and thus at the selected brake, to exceed master cylinder pressure as required for the supplemental apply. Such a system further has a normally closed prime valve that is open during the supplemental apply to permit fluid to be supplied as required to the pump inlet from the master cylinder. A blow-off capability is provided at a predetermined high pressure, preferably in the isolation valve but alternatively or additionally in a separate blow-off valve, the blow-off action of the valve being provided when fluid pressure overcomes an electromagnetic force created by an electric current in a coil applied to close the movable valve element and the electric current preferably being controlled by the system controller to establish the predetermined blow-off pressure. The blow-off capability permits excess fluid to escape back to the master cylinder when the pressure of the fluid provided by the pump to the apply valves exceeds the predetermined blow-off pressure. The brake apply and release valves for the regulated wheel brake are operated to regulate the pressure of pump supplied fluid to the regulated wheel brake. Two parallel fluid circulation paths are established through the pump, one through the brake apply and release valves of the regulated wheel brake and another through the isolation or blow-off valve and master cylinder. Each of these circulation paths includes a fluid reservoir open to the pump inlet: an accumulator in the one path through the apply and release valves and the master cylinder itself in the other path supplementing the capacity of the accumulator. Blow-off action, with its undesirable noise, can be common during a supplemental apply, since the pump normally maintains pressure in the brake lines to the apply valves at a high pressure just under the blow-off pressure and a significant amount of fluid, entering the pump from the master cylinder through the opened prime valve, must be returned to the master cylinder.

If the vehicle operator manually applies the brakes during a supplemental brake apply, pressure in the master cylinder and the brake lines between the master cylinder and the isolation valve is raised. The blow-off action of the isolation or blow-off valve tends to produce audible noise as the moving valve element slams back against the seat after each pulsed release of fluid; and this noise is more easily transmitted to the passenger compartment when the pressure in the master cylinder is high. The noise can be objectionable to vehicle occupants and can occur as long as the brake pedal is depressed during a supplemental brake apply. A reduction in this noise would provide more transparent operation of the supplemental brake apply and greater operator satisfaction with the vehicle in which the brake system is installed.

SUMMARY OF THE INVENTION

In this invention, the noise produced during a supplemental brake apply is reduced, and possibly eliminated, by reducing the necessity for blow-off of excess brake fluid back to the master cylinder. This is accomplished with no change to the basic fluid conduction apparatus of the brake system (except for the addition of a pressure sensor to measure master cylinder pressure, if it is not already present), by changing the way in which the valves of the apparatus are controlled. Although the prime valve is opened at the beginning of a supplemental apply, it is closed after a predetermined quantity of brake fluid is provided to an accumulator connected to the pump inlet, for example by keeping the prime valve open only for a predetermined time period. This quantity of fluid is sufficient to ensure fill of the brake lines and at least partial fill of the accumulator but is preferably sufficiently small so that all excess fluid likely to be required during a supplemental brake apply can be retained in the accumulator. When the quantity of fluid has been provided, the prime valve is closed and preferably remains closed for the duration of the supplemental apply.

The method of this invention can operate with a smaller quantity of excess fluid because of the way in which the apply and release valves are operated. With the prime valve closed, a fluid pressure in the master cylinder is sensed, a first wheel brake apply valve is maintained in an open condition and a first wheel brake release valve is maintained in a closed condition. The first wheel brake apply and release valves are those connecting the pump pressure output to the first (regulated) wheel brake of a pair of wheel brakes such as one half of a diagonal split braking system; but, unlike the prior art, these first apply and release valves are not used for regulation of the first wheel brake. Instead, a second wheel brake apply valve, connecting the pump pressure output to the second (non-regulated) wheel brake of the pair and connected on the pump side to the first wheel brake apply valve, is controlled to regulate fluid pressure from the fluid source so as to provide a predetermined regulated fluid pressure to the second wheel brake apply valve and, by the back pressure produced, through the open first wheel brake apply valve to the first wheel brake. A second wheel brake release valve is controlled to maintain the second wheel brake at the sensed fluid pressure in the master cylinder, which pressure will be lower than the predetermined regulated fluid pressure as long as the vehicle operator does not activate the brakes manually to increase the master cylinder pressure above the predetermined regulated pressure.

In this method, there is no brake fluid circulation through the first brake apply valve of the regulated wheel brake to the accumulator or pump, although the first brake apply valve is fully open, since such circulation is blocked by the closed first brake release valve. And, after the prime valve is closed, there is rarely, if ever, fluid flow through the parallel fluid circulation path of the prior art via the blow-off valve. Essentially, a single fluid circulation path for the pump is established through the second brake apply and release valves of the second (non-regulated) wheel brake and the accumulator. This method provides regulation of the first wheel brake with a more even fluid circulation and thus less need for additional fluid from the accumulator and/or master cylinder. The quantity of excess fluid required is sufficiently small to be stored in the accumulator, and this permits the closure of the prime valve after it has been provided. In addition, brake fluid in the brake lines between the fluid pump and the first and second brake apply valves is maintained at the regulated pressure, which is generally significantly lower, and thus further below the blow-off pressure, than the pressure in these lines using the prior art method. There is thus essentially no need in a supplemental brake apply for blow-off action to release excess fluid to the master cylinder, and objectionable noise is greatly reduced. As an additional benefit, the maintenance of brake pressure at the non-regulated wheel in response to a master cylinder pressure sensor results in at least some braking by the second wheel brake when the vehicle operator manually activates the brakes via the brake pedal and master cylinder during a supplemental brake apply, whereas in the prior art method the second wheel brake apply valve is maintained closed during a supplemental brake apply and the second wheel brake is thus not used.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
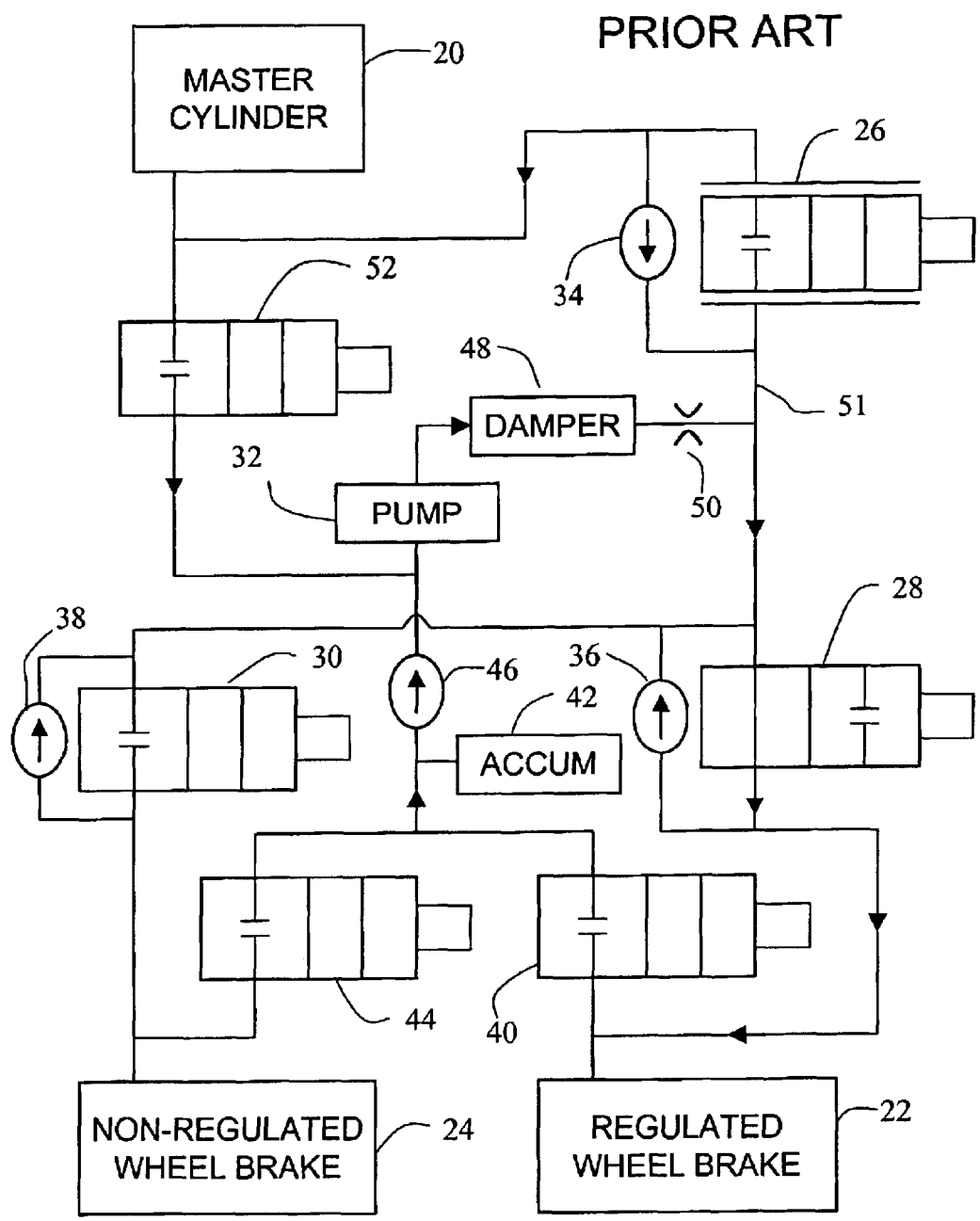
FIG. 1 is a schematic diagram of a brake valve apparatus of the prior art.
Figure 3:
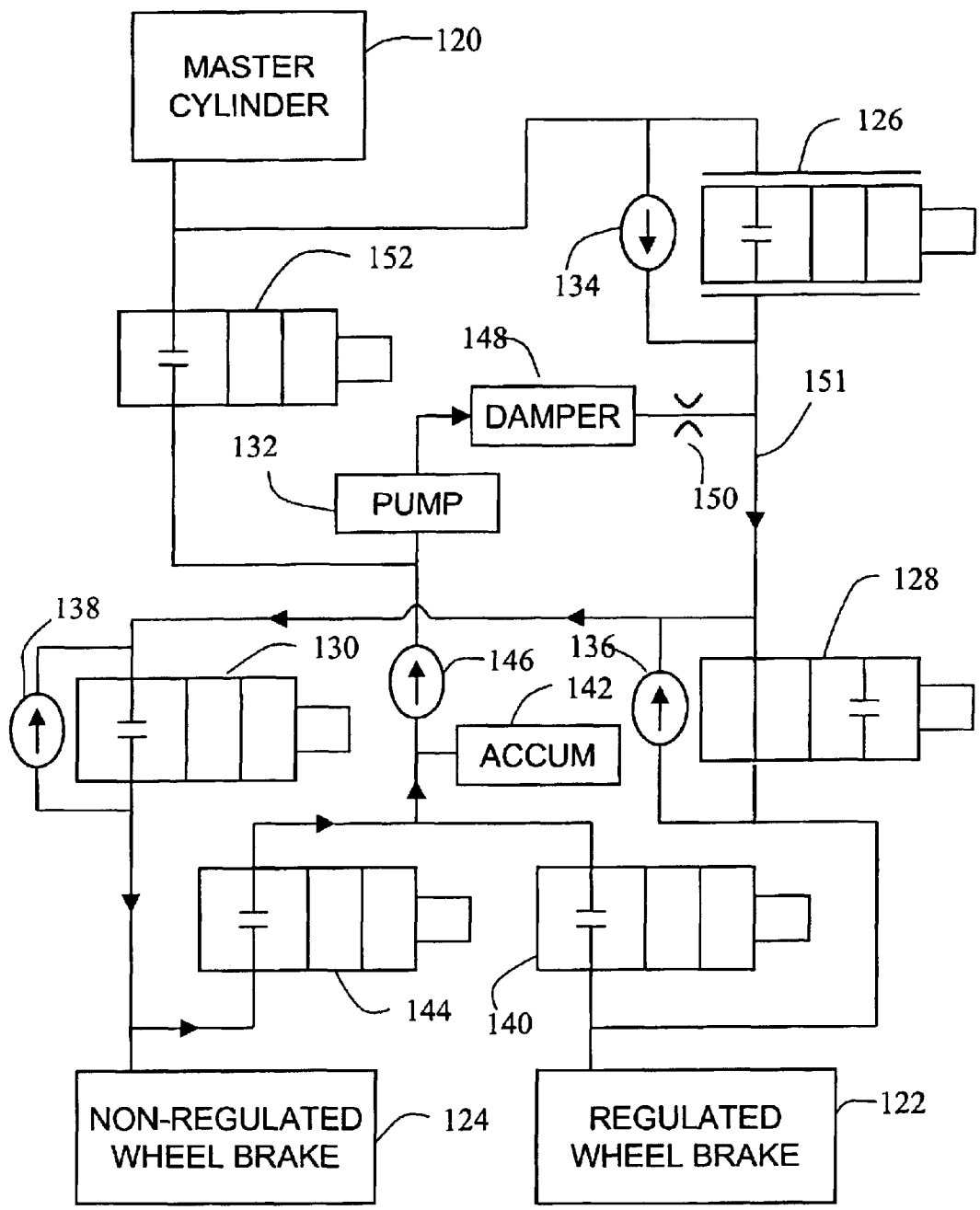
FIG. 3 is a schematic diagram of a brake valve apparatus for the method of this invention.

FIG. 1 shows a brake apparatus including a master cylinder 20 and wheel brakes 22 and 24. Wheel brakes 22 and 24 are typically diagonally opposed wheel brakes forming one half of a split diagonal vehicle braking system. It is understood that the other two diagonally opposed wheel brakes, not shown, will have a similar control apparatus that is a duplicate of that described herein. Because this description will be describing the regulation of brake fluid pressure to one of wheel brakes 22 and 24, the wheel brakes are labelled regulated wheel brake 22 and non-regulated wheel brake 24; but each of wheel brakes 22 and 24 are equally capable of being regulated as described. Both the brake valve apparatus itself, as shown in FIG. 1, and the description of its operation with reference to FIG. 1 are known in the prior art but are produced here as context for the description of this invention with reference to FIGS. 3–5.

Master cylinder 20 is connected through a normally open isolation valve 26 and a normally open apply valve 28 in series to regulated wheel brake 22 and is also connected through isolation valve 26 and a normally open apply valve 30 to non-regulated wheel brake 24. As stated above, non-regulated wheel brake 24 is not regulated in the particular brake apply described herein, but is capable of being regulated in a similar manner. Isolation valve 26 is an electromagnetically controlled blow-off valve having an open state allowing free communication of brake fluid pressure therethrough in either direction and a closed state, as shown, in which the valve can blow off excess brake pressure and fluid back to the master cylinder at pressures above a blow-off pressure which is electromagnetically controllable. An example of such a valve is shown in U.S. Pat. No. 6,247,766, issued Jun. 19, 2001, the disclosure of which is incorporated by reference. In its open state, isolation valve 26 provides direct communication between master cylinder 20 and apply valves 28 and 30 and thus permits base brake operation of wheel brakes 22 and 24 by master cylinder pressure, assuming apply valves 28 and 30 are also open and release valves 40 and 44, to be described below, are closed. In its closed state, isolation valve 26 permits the brake fluid pressure at apply valves 28 and 30 to exceed the master cylinder pressure and thereby permits system generated brake pressure control of wheel brakes 22 and 24 through apply valves 28 and 30 from a positive displacement pump 32. But the closed state is only maintained at brake fluid pressures up to a predetermined maximum or blow-off pressure (e.g. 1700 psi). Brake fluid at the apply valves greater than that predetermined maximum will overcome the electromagnetic force of the coil in the valve and permit opening of the valve to permit escape of some fluid back to the master cylinder and thus blow off the excess pressure. The predetermined maximum or blow-off pressure is maintained by providing a predetermined coil current in the valve under control of the system controller, not shown. Isolation valve 26 is bypassed by a one-way valve 34 permitting flow from master cylinder 20 around isolation valve 28 but not in the opposite direction; and each of apply valves 28 and 30 is also bypassed by a one-way valve, 36 and 38 respectively, permitting flow back toward isolation valve 26 but not toward wheel brakes 22 and 24.

Regulated wheel brake 22 is connected through normally closed release valve 40 to an accumulator 42, and non-regulated wheel brake 24 is connected through normally closed release valve 44 to accumulator 42. Accumulator 42 is connected through a one-way valve to the input of pump 32, the one-way valve permitting flow only from accumulator 42 toward pump 32. The pressure output of pump 32 is connected through a damper 48 and orifice 50 in series to the line 51 connecting isolation valve 26 to apply valves 28 and 30. Pump 32 is electrical motor driven and may be controllably activated to supply brake fluid pressure to the line connecting isolation valve 26 to apply valves 28 and 30 for system generated supplemental brake applies with isolation valve 26 closed. A normally closed prime valve 52 connects master cylinder 20 directly to the inlet of pump 32 and may be opened to allow pump 32 to draw additional fluid from master cylinder 20 as required.

Figure 2:
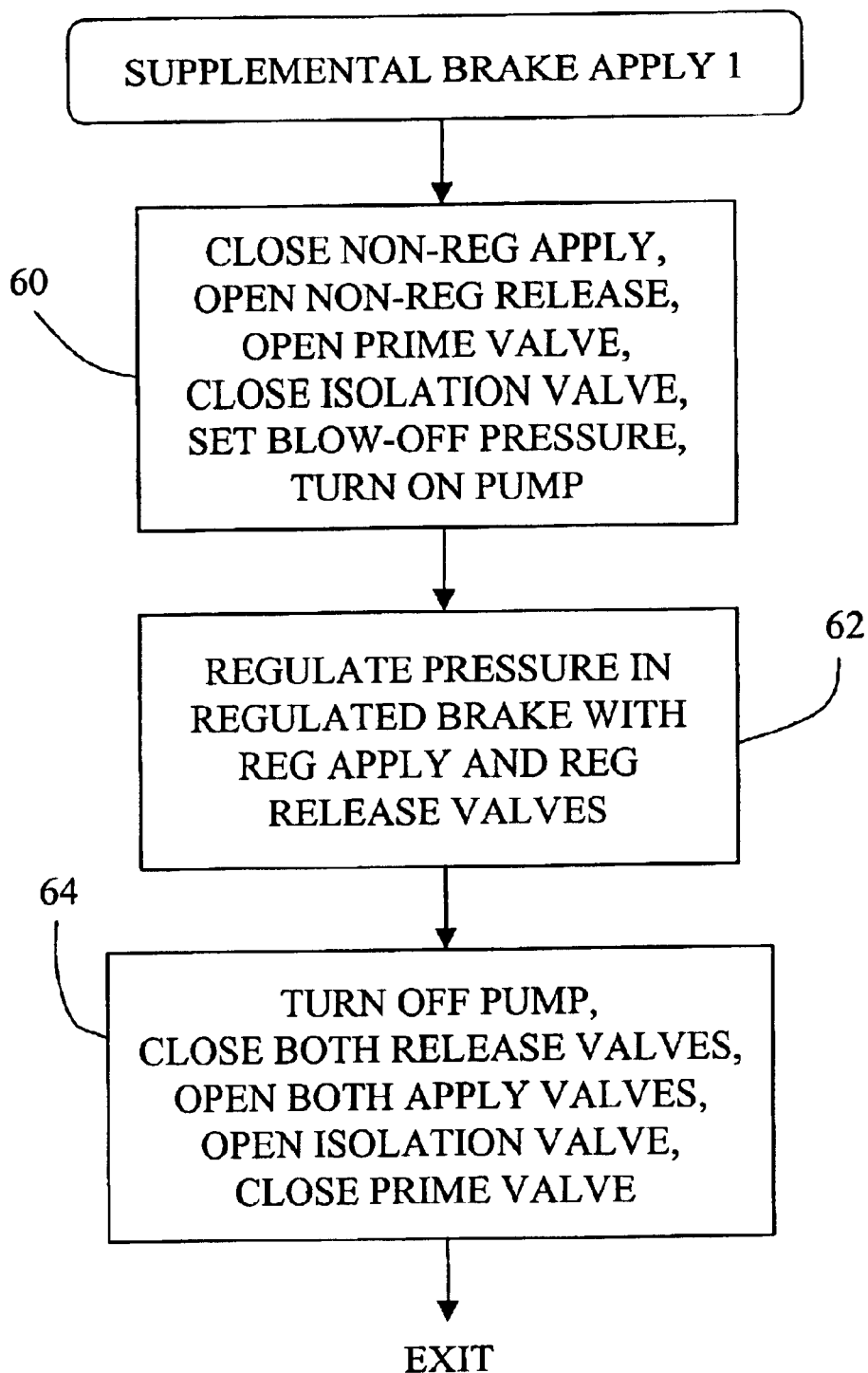
FIG. 2 is a flow chart illustrating the method of the prior art.

The operation of this apparatus according to the methods of the prior art will now be described with reference to the flow chart of FIG. 2. When a supplemental brake apply is commanded for the regulated wheel brake 22, for example in response to a vehicle stability enhancement (VSE) system to counteract an undesired yaw moment, at step 60 the non-regulated apply valve 30 is closed and the non-regulated release valve 44 is opened to prevent actuation of non-regulated wheel brake 24. Prime valve 52 is opened to supply brake fluid from master cylinder 20 to the inlet of pump 32, and isolation valve 26 is closed to permit pump generated braking pressure in line 51 greater than master cylinder pressure. Blow-off pressure in isolation valve 26 is set to a predetermined value such as 1700 psi via the current level in the valve coil.

At step 62, pump 32 is activated. Pump motor current is provided at a predetermined current level to provide an output pressure higher than that required by the wheel brake and also higher than the 1700 psi blow-off pressure of isolation valve 26; and apply valve 28 and release valve 40 are controlled to regulate the pressure to wheel brake 22. A first brake fluid circulation path, shown by arrowheads in the lines in FIG. 1, begins at the pressure output of pump 32, proceeds through damper 48, orifice 50, line 51 and apply valve 28 to regulated wheel brake 22 as permitted by apply valve 28. It continues away from regulated wheel brake 22 through release valve 40, one-way valve 46, as permitted by release valve 40, to accumulator 42 and the inlet of pump 32. Since prime valve 52 remains open, plentiful brake fluid is available for pump 32 from the master cylinder as well as from accumulator 42. When apply valve 28 closes, the fluid from pump 32 dead-heads against isolation valve 26 and, when the blow-off pressure (1700 psi) of isolation valve 26 is exceeded, a second circulation path, also shown by arrowheads in the lines, is established from pump 32 through damper 48, orifice 50, line 51 and isolation valve 26 to the master cylinder 20 and from master cylinder 20 through prime valve 52 back to the inlet of pump 32. When the supplemental brake apply ends, the actions of step 60 are reversed at step 64. Pump 32 is turned off; both release valves are closed, both apply valves are opened; isolation valve 26 is opened and prime valve 52 is closed.

Although this prior art method of controlling regulated brake 22 is satisfactory in most respects, it can produce undesirable noise during blow-off conditions while the vehicle operator is applying the brakes with the brake pedal and master cylinder simultaneously with the system generated brake apply. The noise originates in the repeated noise of the valve element in isolation valve 26 as it re-closes after each brief pressure relief opening and the high pressure brake fluid between the isolation valve and master cylinder transmits the noise. Without changing the basic valve apparatus, the method of this operation modifies the operation of the apparatus described above to reduce the amplitude of this noise.

The undesirable noise described above is reduced by alternative operation of the brake valve apparatus according to the method of this invention. This method will be described with reference to FIG. 3, in which identical elements are given reference numerals greater by 100 than those used in FIG. 1. In a supplemental brake apply of regulated wheel brake 122, prime valve 152 is initially opened only for a short time at the beginning of the brake apply and then closed to prevent additional brake fluid from entering pump 132 from master cylinder 120 during the apply. Brake pressure to the regulated wheel brake 122 is regulated by apply valve 130 of the non-regulated wheel brake 124, with the apply and release valves 128, 140 of the regulated wheel brake 122 left in their normal positions: open and closed, respectively. Apply valve 130 of non-regulated wheel brake 124 controls the brake fluid pressure at regulated wheel 122 via its back pressure rather than its downstream pressure, and may be designed and operated as a controlled blowoff valve similar to valve 126 but provided with a blow-off pressure equal to the desired regulated pressure. Finally, the non-regulated wheel brake 124 is maintained at master cylinder pressure by its release valve 144 in response to a signal from a master cylinder pressure sensor. As shown in the block diagram of FIG. 5, operator activation of brake pedal 154 causes master cylinder 120 to provide a master cylinder pressure to the apply valves of the wheel brakes of the non-controlled diagonal, not shown (it is blocked from apply valves 128 and 130 by closed isolation valve 126 and closed prime valve 152). This pressure is sensed by pressure sensor 156, which provides a signal thereof to brake system controller 158. Controller 158 may comprise a programmed digital computer that, for example, controls the coil current of release valve 144, for example by pulsing the current on and off. The result is a fluid circulation through apply valve 130 and release valve 144 to provide a comparatively even return of brake fluid to accumulator 142. Thus, the system normally has sufficient brake fluid available in accumulator 142 that it does not need additional brake fluid from master cylinder 120 to maintain the regulated pressure of the supplemental apply. Essentially, the second brake fluid circulation loop of the prior art system is minimal to non-existent in terms of flow volume. With the reduction in blow-off action, isolation valve 126 makes much less noise than does isolation valve 26 in the prior art system of FIGS. 1, 2.

Figure 4:
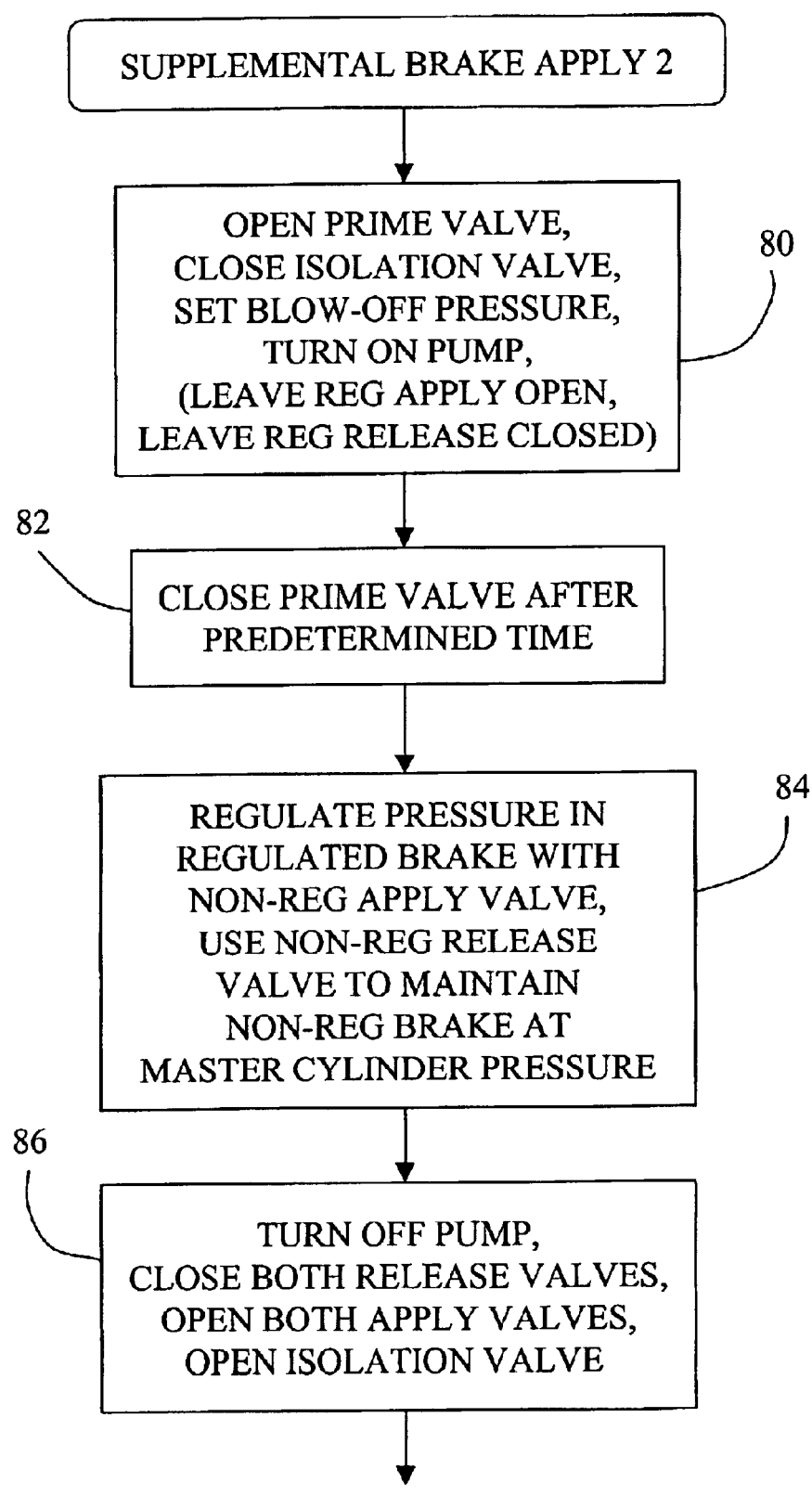
FIG. 4 is a flow chart illustrating the method of this invention.
Figure 5:
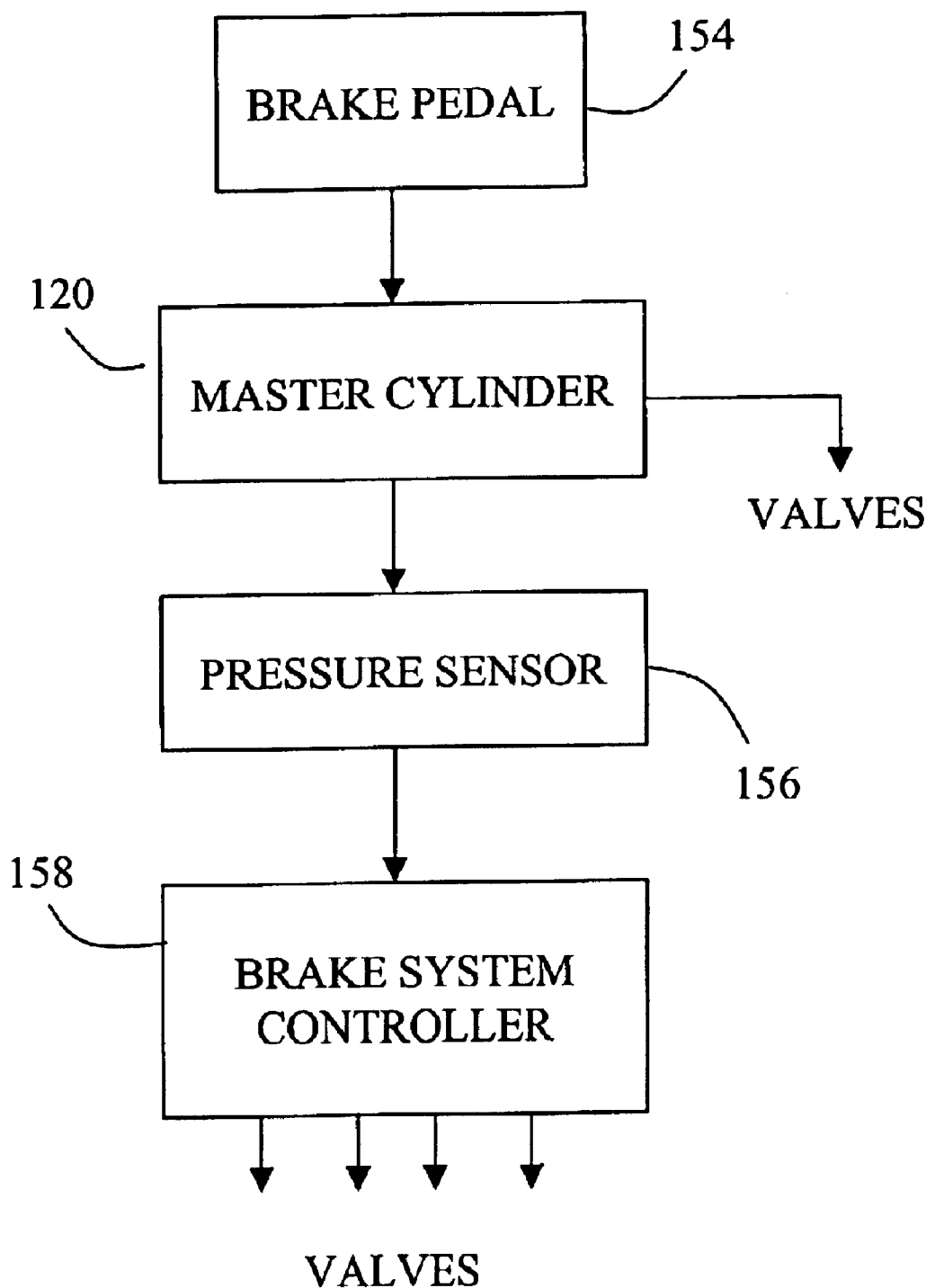
FIG. 5 is a block diagram of apparatus providing control of brake pressure at a wheel brake responsive to sensed master cylinder pressure.

FIG. 4 illustrates the operation of brake system controller 158 when a supplemental brake apply is commanded for the regulated wheel brake 22, for example in response to a vehicle stability enhancement (VSE) system to counteract an undesired yaw moment, the system proceeds as shown at step 80. Routine SUPPLEMENTAL BRAKE APPLY 2 begins at step 80, wherein prime valve 152 is opened; isolation valve 126 is closed; the blow-off pressure in isolation valve 126 is set at a predetermined value (e.g. 1,700 psi) and pump 132 is turned on, as in the prior art system. But apply valve 128 of regulated wheel brake 122 is left open, and release valve 140 of regulated wheel brake 122 is left closed. Thus, the fluid pressure applied to regulated wheel brake 122 is the same as that in line 151, which is the back pressure generated by apply valve 130.

After a short, predetermined time period, at step 82, prime valve 152 is closed to prevent additional provision of brake fluid from master cylinder 120. This predetermined time is calibrated to permit the entry of a predetermined volume of brake fluid from master cylinder 120 that is sufficient for operation of the system but does not exceed the capacity of accumulator 142.

At step 84, the brake apply pressure at apply valve 128 of regulated wheel brake 122 is regulated by apply valve 130 of non-regulated wheel brake 124 in the following manner. As pump 132 outputs brake fluid, the brake fluid pressure in line 151 tends to increase. Apply valve 130 is provided with a maximum or blow-off pressure equal to the intended regulated brake pressure and limits the fluid pressure in line 151 to the regulated pressure by releasing fluid when that pressure is exceeded and otherwise closing to permit pressure increase. Alternatively, valve 130 may be provided with a PWM signal to provide the desired pressure with a controlled fluid bleed from line 151. Since release valve 140 of regulated wheel brake 122 is closed, this regulated back pressure from apply valve 130 of non-regulated wheel brake 124 is applied through the open apply valve 128 to regulated wheel brake 122. Release valve 144 of non-regulated wheel brake 124 is cycled in a manner to pass the brake fluid released by apply valve 130 back to the accumulator and inlet of pump 132 and to maintain pressure in wheel brake 124 equal or close to the master cylinder pressure. Thus the brake apply pressure at wheel brake 124 is maintained close to the pressure in master cylinder 120 as long as that pressure does not exceed the regulated pressure existing in line 151.

The fluid circulation loop from pump 132 proceeds as follows. Fluid exits pump 132 and flows through damper 148, orifice 150 and line 151 to apply valves 128 and 130. Fluid flow proceeds as allowed by apply valve 130 to wheel brake 124 and, as permitted by release valve 144, to accumulator 142 and, through one way valve 146, to the inlet of pump 132. The back pressure created in line 151 by apply valve 130 is communicated through open apply valve 128 to regulated wheel brake 122 but is not released by closed release valve 140. Isolation valve 126 will still limit pressure in line 151 as in the prior art if required, but the necessity for such limiting is much less with this method than with the method of the prior art described above; and, unless prime valve 152 is re-opened, this excess fluid will not find its way back into the fluid circulation loop.

What is claimed is:

1. A method of providing a regulated brake fluid apply to a first wheel brake paired with a second wheel brake in a vehicle braking system, the system having a master cylinder, a fluid pump having an inlet and a pressure output, an accumulator connected to the inlet of the pump, a first wheel brake apply valve connected between the pressure output of the fluid pump and the first wheel brake, a second wheel brake apply valve connected between the pressure output of the fluid pump and the second wheel brake, blow-off valve apparatus connected to limit fluid pressure applied from the pressure output of the pump to the first and second brake apply valves to a first predetermined pressure, a first wheel brake release valve connected to return fluid from the first wheel brake to the accumulator, and a second wheel brake release valve connected to return fluid from the second wheel brake to the accumulator, the method comprising the steps:

providing a quantity of fluid to the accumulator from the master cylinder; and when the quantity of fluid has been provided,
(a) maintaining the first wheel brake apply valve in an open condition and the first wheel brake release valve in a closed condition,
(b) controlling the second wheel brake apply valve to provide a second predetermined fluid pressure less than the first predetermined fluid pressure to the second wheel brake apply valve and through the open first wheel brake apply valve to the first wheel brake, the second predetermined fluid pressure being a desired brake pressure for the first wheel brake; and
(c) activating the second wheel brake release valve to permit flow of brake fluid to the accumulator and maintaining the second wheel brake at a third predetermined pressure below the second predetermined fluid pressure, the third fluid pressure being a desired brake pressure for the second wheel brake.

2. The method of claim 1 further comprising the step of, when the quantity of fluid has been provided, sensing a fluid pressure in the master cylinder and wherein the step of activating the second wheel brake release valve comprises maintaining the second wheel brake at the sensed fluid pressure in the master cylinder when the fluid pressure in the master cylinder does not exceed the second predetermined fluid pressure.

3. The method of claim 1 wherein the vehicle braking system further comprises a normally closed prime valve connecting the master cylinder to the inlet of the fluid pump and the step of providing a quantity of fluid from the master cylinder into the accumulator comprises opening the prime valve to permit the quantity of fluid to pass from the master cylinder to the accumulator and, after the quantity of fluid has so passed, closing the prime valve to block such passing.

4. The method of claim 3 wherein, when the prime valve is closed to end the provision of the quantity of fluid into the accumulator, the prime valve is maintained in a closed position for the remainder of the supplemental brake apply.

5. A method of providing a regulated brake fluid apply to a first wheel brake paired with a second wheel brake in a vehicle braking system, the system having a master cylinder, a fluid pump having an inlet and a pressure output, an accumulator connected to the inlet of the pump, a first wheel brake apply valve connected between the pressure output of the fluid pump and the first wheel brake, a second wheel brake apply valve connected between the pressure output of the fluid pump and the second wheel brake, blow-off valve apparatus connected to limit fluid pressure applied from the pressure output of the pump to the first and second brake apply valves to a first predetermined pressure, a first wheel brake release valve connected to return fluid from the first wheel brake to the accumulator, and a second wheel brake release valve connected to return fluid from the second wheel brake to the accumulator, the method comprising the steps:

providing a quantity of fluid to the accumulator from the master cylinder; and when the quantity of fluid has been provided,
(a) maintaining the first wheel brake apply valve in an open condition and the first wheel brake release valve in a closed condition,
(b) controlling the second wheel brake apply valve to provide a second predetermined fluid pressure less than the first predetermined fluid pressure to the second wheel brake apply valve and through the open first wheel brake apply valve to the first wheel brake;
(c) activating the second wheel brake release valve to permit flow of brake fluid to the accumulator and maintaining the second wheel brake at a pressure below the second predetermined fluid pressure; and
(d) when the quantity of fluid has been provided, sensing a fluid pressure in the master cylinder, wherein the step of activating the second wheel brake release valve comprises maintaining the second wheel brake at the sensed fluid pressure in the master cylinder when the fluid pressure in the master cylinder does not exceed the second predetermined fluid pressure.

6. A method of providing a regulated brake fluid apply to a first wheel brake paired with a second wheel brake in a vehicle braking system, the system having a master cylinder, a fluid pump having an inlet and a pressure output, an accumulator connected to the inlet of the pump, a first wheel brake apply valve connected between the pressure output of the fluid pump and the first wheel brake, a second wheel brake apply valve connected between the pressure output of the fluid pump and the second wheel brake, blow-off valve apparatus connected to limit fluid pressure applied from the pressure output of the pump to the first and second brake apply valves to a first predetermined pressure, a first wheel brake release valve connected to return fluid from the first wheel brake to the accumulator, and a second wheel brake release valve connected to return fluid from the second wheel brake to the accumulator, the method comprising the steps:

providing a quantity of fluid to the accumulator from the master cylinder; and when the quantity of fluid has been provided,
(a) maintaining the first wheel brake apply valve in an open condition and the first wheel brake release valve in a closed condition,
(b) controlling the second wheel brake apply valve to provide a second predetermined fluid pressure less than the first predetermined fluid pressure to the second wheel brake apply valve and through the open first wheel brake apply valve to the first wheel brake;

(c) activating the second wheel brake release valve to permit flow of brake fluid to the accumulator and maintaining the second wheel brake at a pressure below the second predetermined fluid pressure, wherein the vehicle braking system further comprises a normally closed prime valve connecting the master cylinder to the inlet of the fluid pump and the step of providing a quantity of fluid from the master cylinder into the accumulator comprises opening the prime valve to permit the quantity of fluid to pass from the master cylinder to the accumulator and, after the quantity of fluid has so passed, closing the prime valve to block such passing.

7. The method of claim 6 wherein, when the prime valve is closed to end the provision of the quantity of fluid into the accumulator, the prime valve is maintained in a closed position for the remainder of the supplemental brake apply.

* * * * *